US012556051B2

(12) United States Patent
Rolston et al.

(10) Patent No.: US 12,556,051 B2
(45) Date of Patent: Feb. 17, 2026

(54) ROTOR COOLING

(71) Applicant: Cummins Generator Technologies Limited, Peterborough (GB)

(72) Inventors: Robert Rolston, Peterborough (GB); Anand Odedra, Peterborough (GB); Jonathan Nutt, Peterborough (GB); Abhinav P. Tobin, Peterborough (GB)

(73) Assignee: Cummins Generator Technologies Limited, Peterborough (GB)

( * ) Notice: Subject to any disclaimer, the term of this patent is extended or adjusted under 35 U.S.C. 154(b) by 324 days.

(21) Appl. No.: 17/535,105

(22) Filed: Nov. 24, 2021

(65) Prior Publication Data

US 2022/0085676 A1 Mar. 17, 2022

Related U.S. Application Data

(63) Continuation of application No. PCT/GB2020/051275, filed on May 27, 2020.

(30) Foreign Application Priority Data

May 30, 2019 (GB) ..................................... 1907642

(51) Int. Cl.
*H02K 1/32* (2006.01)
*H02K 3/24* (2006.01)
*H02K 9/00* (2006.01)

(52) U.S. Cl.
CPC ................. *H02K 1/32* (2013.01); *H02K 3/24* (2013.01)

(58) Field of Classification Search
CPC .. H02K 9/00; H02K 9/10; H02K 9/19; H02K 9/197; H02K 9/22; H02K 9/227;
(Continued)

(56) References Cited

U.S. PATENT DOCUMENTS 2,844,746 A * 7/1958 Coggeshall .............. H02K 3/51
310/270
3,846,651 A 11/1974 Mishra
(Continued)

FOREIGN PATENT DOCUMENTS

CN 103036338 A * 4/2013 ............... H02K 1/32
CN 107994736 A * 5/2018 ............... H02K 5/20
(Continued)

OTHER PUBLICATIONS

International Search Report & Written Opinion for International Application No. PCT/GB2020/051275, dated Aug. 13, 2020, 14 Pages.
(Continued)

*Primary Examiner* — Tran N Nguyen
(74) *Attorney, Agent, or Firm* — Foley & Lardner LLP

(57) ABSTRACT

A rotor (10) for a rotating electrical machine is disclosed. The rotor comprises a plurality of salient poles (12) and rotor windings (22, 24) wound on the salient poles. A cooling vent (26) is provided through the rotor windings, the cooling vent extending through the rotor windings in an axial direction and a radial direction. The cooling vent (26) extends in an axial direction from one end of the rotor pole to the other. The cooling vent (26) may be formed by a plurality of discontinuous spacers (28), or by a spacer (78) which extends continuously around the rotor pole (12). Providing a cooling vent which extends through the rotor windings in an axial direction and a radial direction may help to improve the thermal performance of the machine in efficient and cost-effective manner.

16 Claims, 12 Drawing Sheets

(58) Field of Classification Search
CPC .. H02K 1/00; H02K 1/20; H02K 1/32; H02K 1/325; H02K 1/24; H02K 1/52; H02K 1/527; H02K 3/00; H02K 3/12; H02K 3/24; H02K 3/32; H02K 3/34; H02K 3/48; H02K 3/4875

See application file for complete search history.

(56) References Cited

U.S. PATENT DOCUMENTS

| | | | | |
|---|---|---|---|---|
| 4,118,646 | A | * 10/1978 | Fleming | H02K 9/225 310/58 |
| 7,638,909 | B2 | 12/2009 | Hattori et al. | |
| 2011/0115315 | A1 | * 5/2011 | Laloy | H02K 3/24 310/59 |
| 2014/0265660 | A1 | * 9/2014 | Kulkarni | H02K 9/197 310/54 |
| 2016/0149451 | A1 | 5/2016 | Teter et al. | |
| 2019/0109513 | A1 | * 4/2019 | Bethge | H02K 9/197 |
| 2020/0112217 | A1 | 4/2020 | Pal | |

FOREIGN PATENT DOCUMENTS

| | | | |
|---|---|---|---|
| CN | 108258824 | 7/2018 | |
| EP | 2 289 148 A2 | 3/2011 | |
| GB | 0 974 730 | 11/1964 | |
| GB | 2 425 662 | 11/2006 | |
| GB | 2425662 A * | 11/2006 | ............... H02K 9/00 |
| GB | 2 453 572 | 4/2009 | |
| JP | 736561 U | 7/1995 | |
| JP | 2002-058188 A | 2/2002 | |
| WO | WO-2010/079455 | 7/2010 | |
| WO | WO2017162389 A1 * | 9/2017 | |

OTHER PUBLICATIONS

Search Report for GB Application No. GB1907642.1, dated Nov. 21, 2019, 4 pages.
Examination Report in IN Application No. 20214706874, dated Nov. 7, 2023, 7 pgs.
Hearing Notice in IN Application No. 202147060874, dated Jun. 7, 2024, 3 pgs.
Office Action in CN Application No. 202080038887.7, dated May 6, 2024, 19 pgs. (with translation).

* cited by examiner

ROTOR COOLING

This application is a continuation of PCT/GB2020/051275 filed May 27, 2020, which claims priority to United Kingdom Patent Application No. 1907642.1 filed May 30, 2019, the entire contents of which are incorporated herein by reference.

The present invention relates to rotating electrical machines of a salient pole design, and in particular to techniques for improving the cooling of such machines.

Rotating electrical machines, such as motors and generators, generally comprise a rotor and a stator, which are arranged such that a magnetic flux is developed between the two. In a rotating machine of a salient pole design, the rotor has a plurality of poles which extend radially outwards, on which a conductor is wound. An electrical current flowing in these windings causes a magnetic flux to flow across the air gap between the rotor and the stator. In the case of a generator, when the rotor is rotated by a prime mover, the rotating magnetic field causes an electrical current to flow in the stator windings, thereby generating the output power. In the case of a motor, an electrical current is supplied to the stator windings and the thus generated magnetic field causes the rotor to rotate.

In electrical machines losses may occur due to, for example, resistance in the windings and in losses in the pole body. These losses result in heat being created within the machine. Therefore many machines include a fan for forcing air flow through the machine. Air flow through the machine is generally in an axial direction. The main paths for the air flow are through the rotor/stator airgap, and through an air gap between the stator core and the stator frame.

The machine rating is determined by the actual temperature rise of the rotor and stator, and thus the cooling efficiency of the construction may help to determine the rating of the machine. In a typical machine, a greater proportion of the cooling air passes around the stator rather than the rotor. It would therefore be desirable to increase the proportion of air flow through the rotor, in order to achieve more balanced cooling. However, improving the rotor's cooling performance has been found to be challenging. This is due in part to the fact that a small rotor/stator air gap is necessary for good electromagnetic performance.

GB 2 425 662 A, the subject matter of which is incorporated herein by reference, discloses a rotating electrical machine in which a radial cooling duct is provided in the rotor between two layers of windings in an area which is overlapped by a pole shoe. This can allow radial air flow through the windings, which can help to cool the rotor. However, the need to provide entry and exit paths to the radial vents can increase the cost and complexity of the machine, and the complex air flow paths may reduce the effectiveness of the cooling.

WO 2010/079455, the subject matter of which is incorporated herein by reference, discloses a rotor for a rotating electrical machine, the rotor comprising a plurality of support elements for supporting rotor windings. The support elements include a spacer element that is placed between two electrical conductor groups so as to form a cooling channel between the two conductor groups. This can enable a cooling fluid to flow longitudinally within the windings. However, the disclosed arrangement is complex and may be difficult to manufacture. Furthermore, the windings may be subject to centrifugal forces which may cause them to slip or deform if not supported. In addition, the support elements may be subject to high forces, requiring them to have a relatively large axial profile, which may limit the amount of cooling fluid that can flow through the windings.

Therefore, there remains a need for an efficient and cost-effective way of improving the thermal performance of a salient pole rotating electrical machine.

According to one aspect of the present invention there is provided a rotor for a rotating electrical machine, the rotor comprising a plurality of salient poles, rotor windings wound on the salient poles, and a cooling vent through the rotor windings, the cooling vent extending through the rotor windings in an axial direction and a radial direction, wherein the cooling vent extends in an axial direction from one end of the rotor pole to the other.

The present invention may provide the advantage that, by providing a cooling vent which extends through the rotor windings in an axial direction and a radial direction, a tendency of the windings to slip or deform under centrifugal force as the rotor rotates may be reduced. This in turn may allow spacers to be discontinuous and/or present a lower profile to air flow through the cooling vent. In addition, it may be possible to use round conductors for the windings, rather than the square conductors which are used in some previous designs. It has also been found that the manufacturing process may be less complex and/or less expensive than with some previous designs. Furthermore, the increased cooling may allow fewer turns of windings to be used, thereby reducing the cost of the machine and the rotating mass.

By "axial direction" it is preferably meant a direction in which at least the major component is parallel to the axis of the rotating electrical machine, although other components (such as radial and/or circumferential) may also be present. By "radial direction" it is preferably meant a direction in which at least the major component is radial to the axis of the rotating electrical machine and/or parallel to a salient pole, although other components (such as tangential) may also be present.

Preferably an entry path to the cooling vent is provided at one end axially of the rotor and an exit path from the cooling vent is provided at the other end axially of the rotor. This can allow cooling fluid to pass through the whole of the rotor in an axial direction, which may be the general direction of air flow through the machine. Preferably a continuous air flow path is provided axially through the cooling vent from one end of the rotor to the other. Preferably an air flow path is provided in a straight line through the cooling vent from one end of the rotor to the other.

Preferably the cooling vent extends radially through the whole of the windings, such as from the radially inner side to the radially outer side of the windings. For example, the cooling vent may extend from a winding support to a pole shoe. Alternatively, the cooling vent could extend radially through part of the windings. For example, the cooling vent could extend radially through at least 50%, 60%, 70%, 80% or 90% of the windings, or some other value.

Preferably the rotor windings comprise a first set of windings and a second set of windings on the same rotor pole, and the cooling vent is formed between the two sets of windings. This may provide a convenient way of forming the cooling vent, and may allow the vent to sit at or towards the centre of the windings. The first set of windings and the second set of windings may be part of the same coil (that is, wound using the same conductor) or they may comprise two (or more) coils connected for example in series or in parallel. The conductor may be, for example, a wire such as a copper wire.

The windings may comprise a conductor having any appropriate cross section. For example, in one embodiment the windings comprise a round conductor, such as a conductor having a circular or oval cross section. In this case, the windings may be wound in an orthocyclic winding structure, although any other suitable winding structure could be used instead. In another embodiment, the windings comprise a conductor having a polygonal cross section, such as a conductor with a square, rectangular or hexagonal cross section. This may allow a higher winding fill factor to be achieved. Furthermore, use of a conductor with a polygonal cross section may allow a flat surface to be presented to the cooling vent, and may help to provide a more stable mechanical interface with other components such as a spacer. If desired, a combination of different types of conductor could be used.

Preferably the first set of windings is beneath the second set of windings, in a direction away from the pole (for example, a direction in which subsequent layers of windings are wound, which may be substantially tangential with respect to the axis of rotation of the machine). This can allow the air gap to extend between the two sets of windings in a substantially radial direction and/or parallel to the rotor pole. This may reduce the tendency of the windings to enter the air gap under centrifugal force as the rotor rotates.

The rotor may further comprise a spacer between the two sets of windings. This can help to ensure that the two sets of windings are held apart during operation of the machine. The spacer may comprise, for example, two parallel walls held apart by spacing elements to create air passages. In this case, each wall may interface with one of the two sets of windings. The spacing elements may be, for example, walls, studs, support beams, or any other appropriate structure for holding apart the two parallel walls.

In one embodiment, the rotor comprises a plurality of spacers. The spacers may be provided at spaced locations in an axial direction through the windings. This may reduce the weight of the spacers and the amount of material required. Furthermore, providing discontinuous spacers can allow the windings to be exposed to the cooling vent at locations between the spacers. This can increase the area of the windings which is exposed to cooling fluid, thereby increasing the effectiveness of the cooling.

Preferably each spacer is arranged such that, when the rotor has been wound with the first set of windings (but not the second), the spacer can be held on the rotor with an interference fit. For example, the spacer may be arranged to fit between a winding support and a pole shoe with a light interference fit. This can allow the spacer to be held in place as the second set of windings is wound on the rotor. Alternatively, some other means of retention, such as a tab and/or adhesive, could be used to retain the spacers.

In another embodiment, the rotor the spacer extends continuously around the rotor pole. The continuous spacer may loop around the rotor pole, between both the side windings and the end windings of the two sets of windings. This embodiment may help to simplify manufacture and/or help prevent slippage or deformation of the windings into the cooling vent.

The rotor may further comprise a winding support for supporting the windings. For example, an L-shaped winding support may be provided which may sit on the radially inwards side of the windings of two adjacent poles. The winding support may function to hold up the windings during the winding process and when the machine is in use.

The winding support may comprise a first arm and a second arm arranged at a (non-zero) angle to each other. The angle may be, for example, between about 80° and 100° and preferably around 90°. Each arm may be used to support the side windings of a respective rotor pole.

In one embodiment a plurality of winding supports is provided at spaced locations in an axial direction through the rotor. In this case, where a plurality of spacers is provided, each winding support may be collocated with a spacer in an axial direction (for example, beneath a spacer in a radial direction). This can allow the winding support to support the spacer as well as the windings, and thus may help to prevent deformation of the windings.

In practice, it has been found pursuant to the present invention that air flow from an axial cooling vent may have a tendency to escape from the vent into a bottom air gap between two rotor poles, which may reduce the effectiveness of the cooling. However, it has been found that it may be possible to reduce this tendency by providing deflectors which deflect air flow back up into the cooling vent. Conveniently, such deflectors may be provided on the winding supports.

Therefore, the winding support may comprise a deflector for deflecting air flow into the cooling vent. Preferably, the deflector extends into an axial air channel between two adjacent poles, for example, a bottom interpolar axial channel, which may be beneath the winding support.

Where the winding support comprises a first arm and a second arm, each arm may comprise a deflector. The deflector may extend from the arm at a (non-zero) angle thereto (and at an angle to the axial direction). The angle may be, for example, greater than 25°, 30° or 35°, and may be around 45°.

The rotor may further comprise a wedge for retaining the windings. The wedge may sit between the side windings of two adjacent poles, on the outside of the windings, in order to help retain the windings. In order to retain the wedge, each end of the wedge may sit under a pole shoe of a respective one of two adjacent poles. Preferably, the wedge is collocated with a spacer in an axial direction. For example, the wedge may be located above a spacer in a direction away from the rotor pole. This may help to prevent the wedge from pushing the windings into the axial cooling vent.

The rotor windings may comprise side windings (windings which run in an axial direction along the side of the rotor pole) and end windings (windings which run around the end of the rotor pole). In this case, at least part of the cooling vent may be an axial cooling vent which runs through the side windings. However, the cooling vent may also extend at least partially into the end windings. Thus, the cooling vent may be formed in both the side windings and the end windings. In this case, the cooling vent may be continuous for some or all of the way around each rotor pole. This may assist with cooling of the end windings as well as the side windings and/or provide entry and exit points for air flow through the cooling vent.

Each rotor pole may comprise at least two axial cooling vents, one on each side of the rotor pole. Furthermore, the or each cooling vent may also extend into the end windings at each end of the rotor pole.

The rotor may further comprise an end winding support between end windings of the two sets of windings. For example, one or more end winding supports may be provided towards the centre of the end windings. The end winding support may help to maintain an air gap in the end windings and may allow the rotor to be taped without collapsing the air gap. Alternatively, or in addition, one or more spacers could be provided between the end windings of the two sets of windings.

As mentioned above, in one embodiment of the invention the rotor comprises a continuous spacer between two sets of windings. This embodiment may also be provided independently. Thus, according to another aspect of the invention, there is provided a rotor for a rotating electrical machine, the rotor comprising a plurality of salient poles, rotor windings wound on the salient poles, and a cooling vent through the rotor windings, wherein the cooling vent is formed by a spacer which extends continuously around the rotor pole.

This aspect of the invention may provide the advantage that, by forming a cooling vent using a spacer which extends continuously around the rotor pole, a tendency of the windings to slip or deform as the rotor rotates may be reduced. Furthermore, the manufacturing process may be simplified compared to some previous designs.

By "extends continuously" it is preferably meant that the spacer extends through at least part and preferably the whole of the side windings and preferably through at least part or the whole of the end windings.

In this aspect of the invention, the cooling vent may extend through the windings in an axial direction and a direction away from the rotor pole (for example, a tangential direction). For example, the rotor windings may comprise a first set of windings and a second set of windings on the same rotor pole, the cooling vent may be formed between the two sets of windings, and the first set of windings may be adjacent to the second set of windings in a radial direction. Preferably the air gap extends tangentially through the whole of the windings, for example from the pole to a wedge, although it could extend part way through the windings (for example, through at least 50%, 60%, 70%, 80% or 90% of the windings, or some other value).

Alternatively, the cooling vent may extend through the rotor windings in an axial direction and a radial direction, as in previous embodiments.

In order to facilitate manufacture, the continuous spacer may comprise two or more interlocking parts. For example, the continuous spacer may comprise two substantially U-shaped parts which are brought together around the rotor pole, and which are then connected together using an interlocking joint such as a dovetail joint.

In any of the above arrangements, a plurality of cooling vents (for example, 2, 3 or more) may be provided through the rotor windings. For example, a plurality of cooling vents could be provided, each of which extends through the rotor windings in an axial direction and a radial direction. In this case, three or more sets of windings may be provided on the same rotor pole, and each cooling vent may be formed between two (adjacent) sets of windings. A plurality of spacers may be provided at spaced locations within at least some of the cooling vents. Alternatively, or in addition, a plurality of cooling vents may be provided, at least some of which are formed by a spacer which extends continuously around the rotor pole.

According to another aspect of the invention there is provided a rotating electrical machine comprising a stator and a rotor in any of the forms described above. The machine may further comprise a fan for forcing cooling air through the machine.

Corresponding methods may also be provided. Thus, according to another aspect of the invention, there is provided a method of winding a rotor for a rotating electrical machine, the rotor comprising a plurality of salient poles, the method comprising winding a pole with a first set of windings and a second set of windings with a cooling vent therebetween, the cooling vent extending through the rotor windings in an axial direction and a radial direction, wherein the cooling vent extends in an axial direction from one end of the rotor pole to the other.

The method may further comprise inserting at least one spacer and tooling on the first set of windings, winding the second set of windings on the spacers and tooling, and removing the tooling.

According to a further aspect of the invention there is provided a method of winding a rotor for a rotating electrical machine, the rotor comprising a plurality of salient poles, the method comprising:

winding a pole with a first set of windings;
inserting at least one spacer and tooling on the first set of windings;
winding a second set of windings on the spacers and tooling; and
removing the tooling to leave an air gap between the two sets of windings, the air gap forming an axial cooling vent.

The tooling may comprise a corner support to support the corners of the second set of windings during the winding process.

Features of one aspect of the invention may be provided with any other aspect. Apparatus features may be provided with method aspects and vice versa.

In the present disclosure, terms such as "radially", "axially", "tangentially" and "circumferentially" are generally defined with reference to the axis of rotation of the electrical machine, unless the context implies otherwise.

Preferred embodiments of the present invention will now be described, purely by way of example, with reference to the accompanying drawings, in which.

Figure 16A:
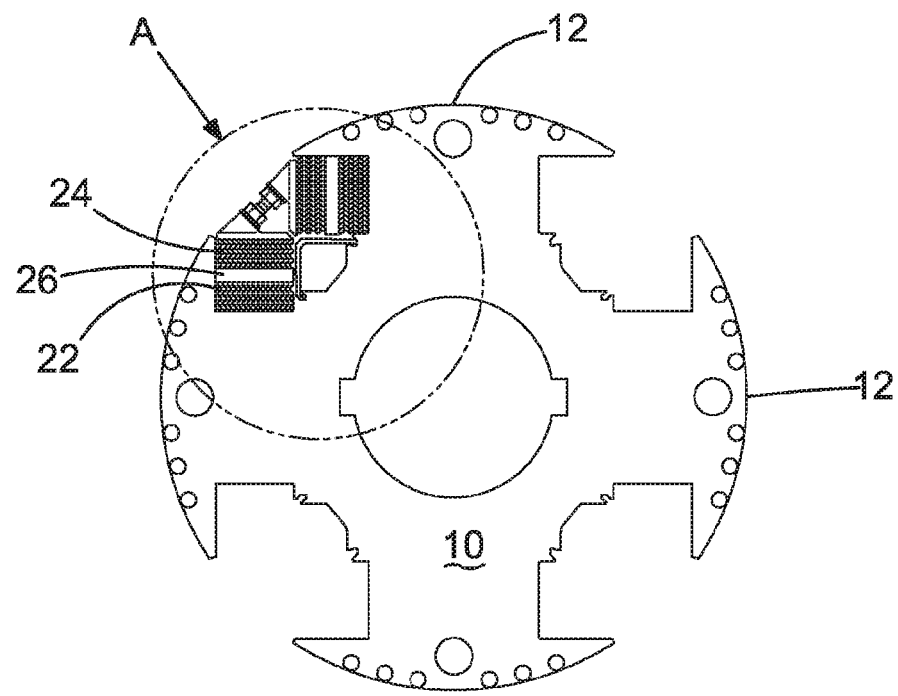
Figure 16B:
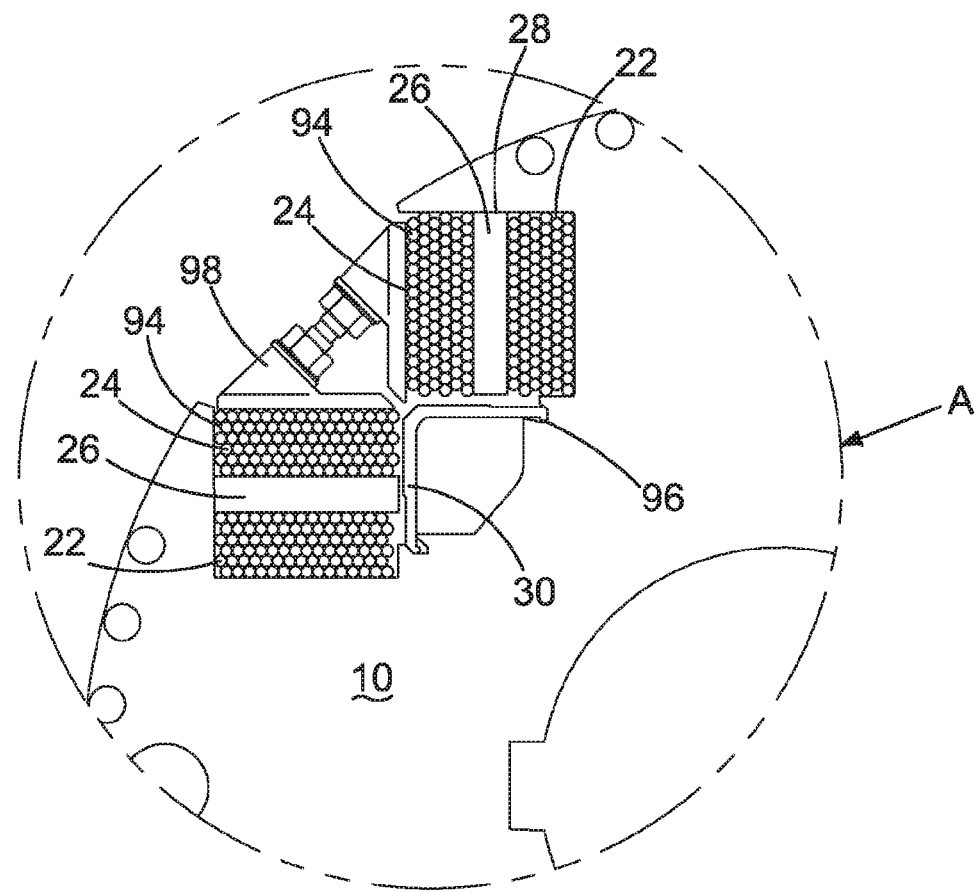
Figure 17A:
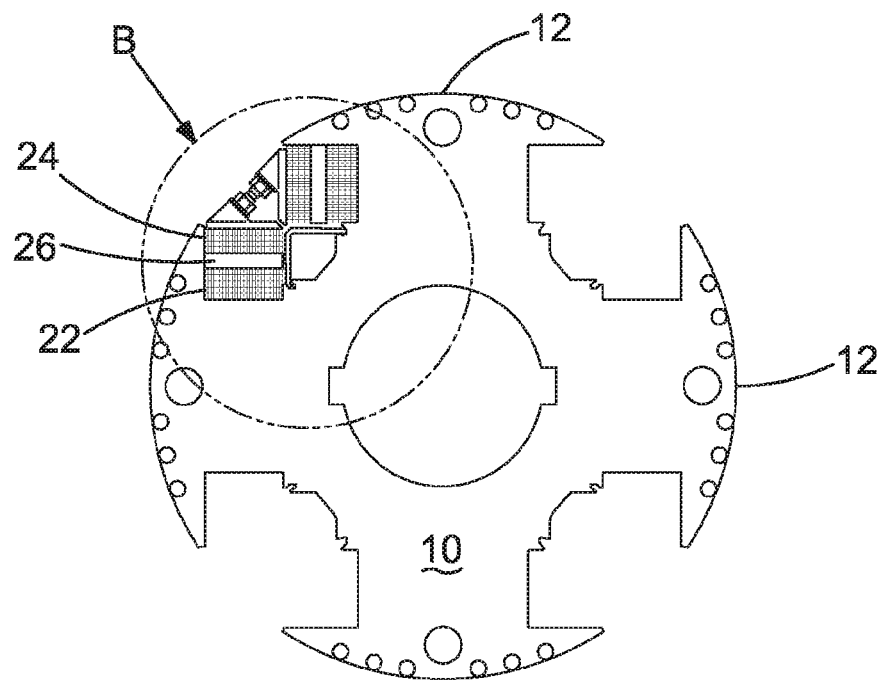
Figure 17B:
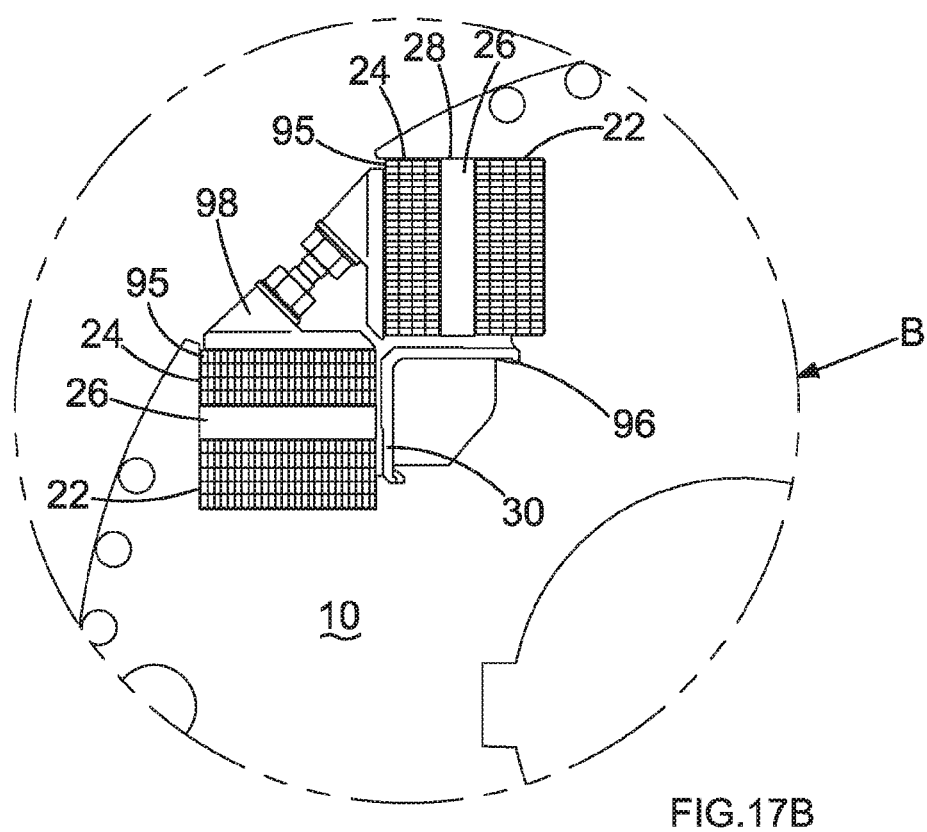

FIGS. 16(A) and 16(B) illustrate an embodiment of the invention using round conductors; and FIGS. 17(A) and 17(B) illustrate an embodiment of the invention using square conductors.

Figure 1:
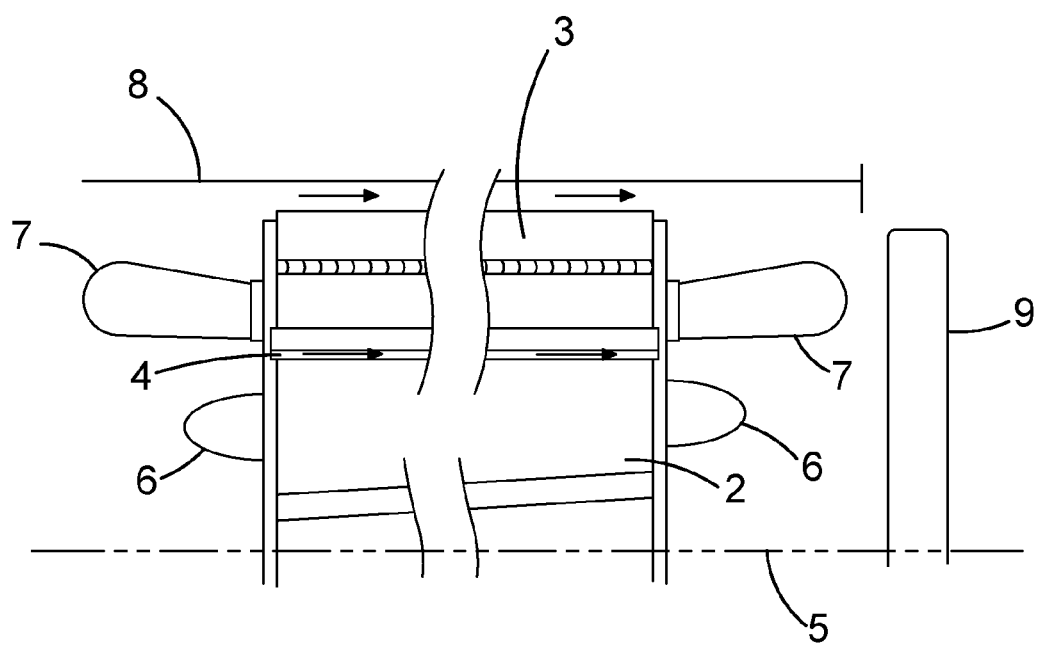
FIG. 1 is a radial cross section through part of a known rotating electrical machine.

FIG. 1 is a radial cross section through part of a known rotating electrical machine. The machine comprises a rotor 2 located inside a stator 3 with an air gap 4 between the two. The rotor 2 is mounted on a shaft with an axis of rotation indicated by the dashed line 5. The rotor 2 is wound with rotor windings 6. The stator 3 comprises a stator core with slots on its inner circumference in which are wound stator windings 7. The stator 3 is contained within a stator frame 8. A shaft-driven fan 9 is located at the drive end of the machine, in order to draw cooling air through the machine. This air flow is predominately in an axial direction through the rotor/stator air gap and the stator/frame air gap, as indicated by the arrows in FIG. 1. If desired, an external, independently-driven fan or fans or any other appropriate means of forcing air through the machine could be used instead of a shaft driven fan.

Figure 2:
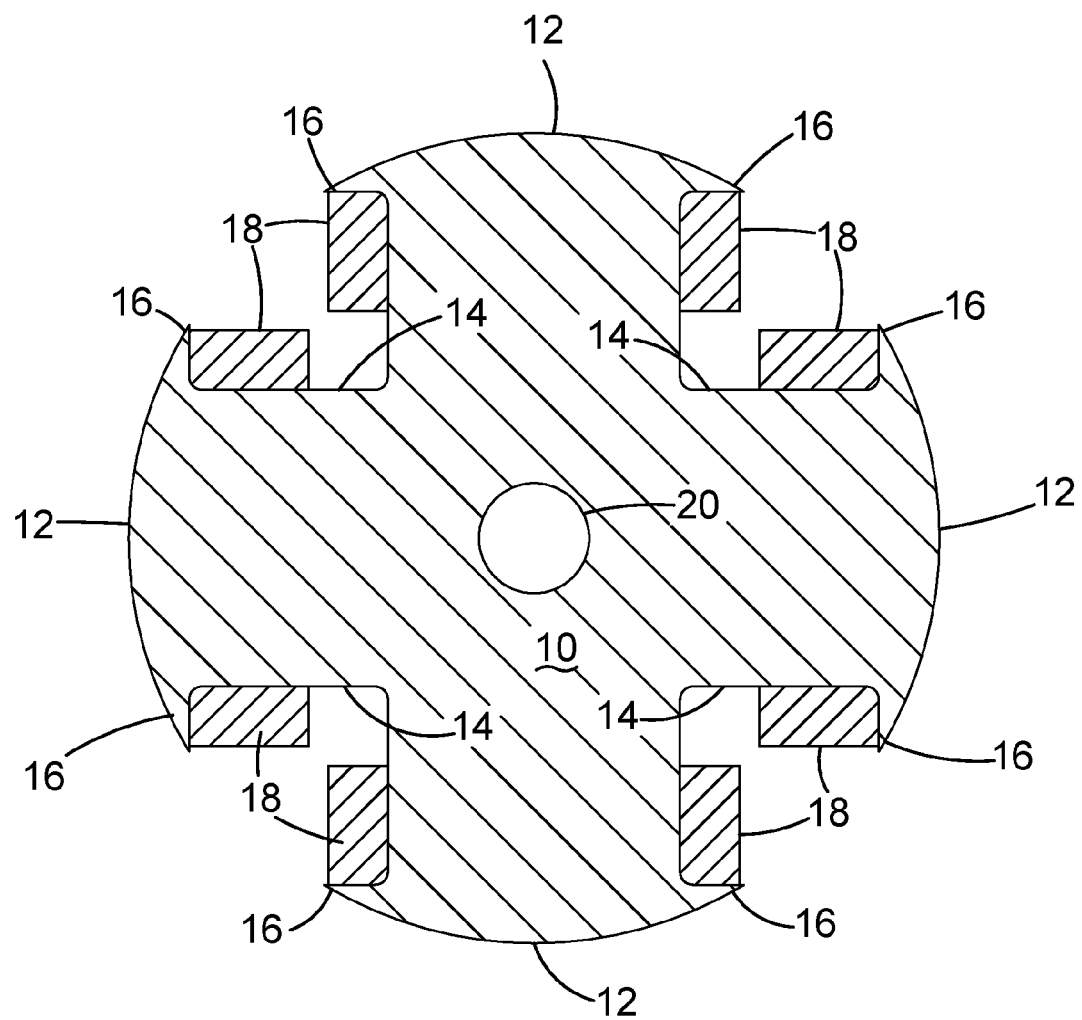
FIG. 2 is an axial cross section through part of a rotor in a known rotating electrical machine.

FIG. 2 is an axial cross section through part of a rotor in a known rotating electrical machine. Referring to FIG. 2, a rotor body 10 is formed from a plurality of laminated sheets of metal stacked together to create a rotor of the required axial length. The rotor body 10 comprises a plurality of salient poles 12, each of which extends radially outwards from the centre of the rotor body. The salient poles comprise a main body 14 and a pole shoe 16 on the leading and trailing edge. Each salient pole is wound with rotor windings 18. The windings 18 are in the form of a coil comprising a conductor such as copper wire which is wound around the main body 14, beneath the pole shoes 16. The windings 18 comprise side windings which run in a substantially axial direction along the length of the rotor beneath the pole shoes (perpendicular to the plane of the paper in FIG. 2), and end windings which run in a substantially tangential direction around the end of the rotor (parallel to the plane of the paper in FIG. 2). In this example the rotor has four poles, although of course different machines may have a different number of poles.

In operation, the rotor rotates about central axis 20. An electrical current is supplied to the windings 18, which causes a magnetic flux to develop between the rotor and the stator. The pole shoes 16 assist in retaining the windings 18 against centrifugal force as the rotor rotates.

Figure 3:
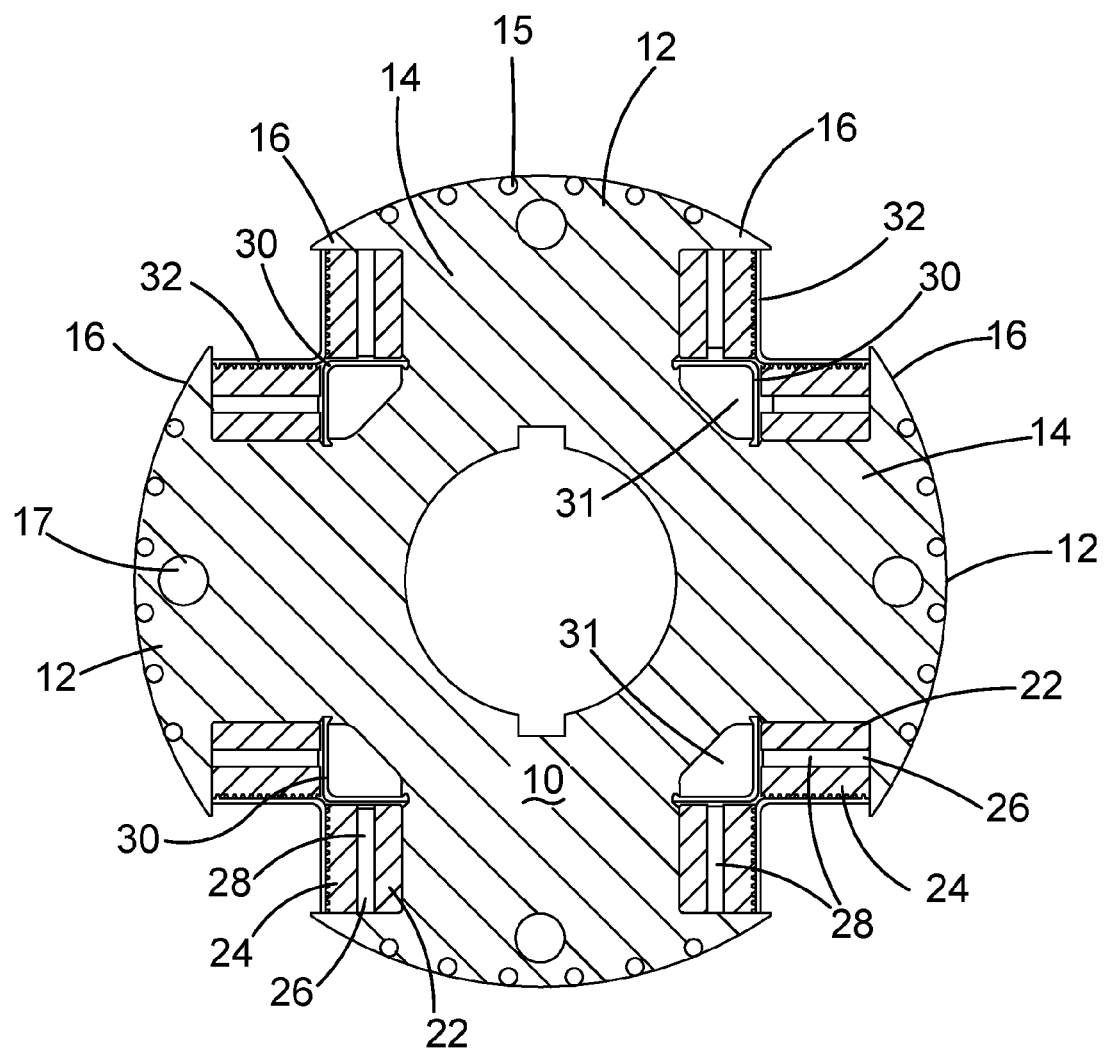
FIG. 3 is an axial cross section through part of a rotor in an embodiment of the invention.

FIG. 3 shows an axial cross section through part of a rotor in accordance with an embodiment of the invention. Referring to FIG. 3, the rotor comprises a rotor body 10 with a plurality of salient poles 12, in a similar way to the rotor of FIG. 2. However, in FIG. 3, each pole is wound with a first, inner set of windings 22 and a second, outer set of windings 24. L-shaped winding supports 30 are provided beneath the windings of two adjacent poles, to support the underside of the windings. The windings 22, 24 are wound between the winding supports 30 and the pole shoes 16. Retaining wedges 32 are provided on the outside of the windings (away from the main bodies of the poles) to hold the windings in place. The retaining wedges 32 are also L-shaped, and fit under the tips of two adjacent pole shoes 16, in order to retain the side windings of two adjacent poles. A bottom, interpolar axial channel 31 extends through the rotor between two adjacent poles underneath the windings 22, 24 and the winding supports 30. In addition, damper bars 15 and rotor lamination support bars 17 are provided which run in an axial direction through the poles.

In the arrangement of FIG. 3, on each pole, the first set of windings 22 and the second set of windings 24 are arranged with an air gap 26 between the two. To achieve this, the first set of windings 22 and the second set of windings 24 are held apart using hollow spacer blocks 28. The air gap 26 is formed in place of one or more layers of windings which would otherwise be present at or towards the centre of the windings. In this embodiment, the air gap 26 extends substantially the whole of the way around the rotor, through both the side windings and the end windings. The air gap also extends through the whole of the windings in a substantially radial direction, from the side of the windings adjacent to the winding supports 30 to the side of the windings adjacent to the pole shoes 16.

The air gaps 26 of FIG. 3 form axial cooling vents, that is, vents which run through the rotor windings in an axial direction (perpendicular to the plane of the paper in FIG. 3). The axial vents are located between the side windings of the two sets of windings 22, 24, under the pole shoes 16. The axial vents extend through the whole of the side windings in an axial direction. The axial cooling vents allow air to flow axially through the rotor windings.

Figure 4:
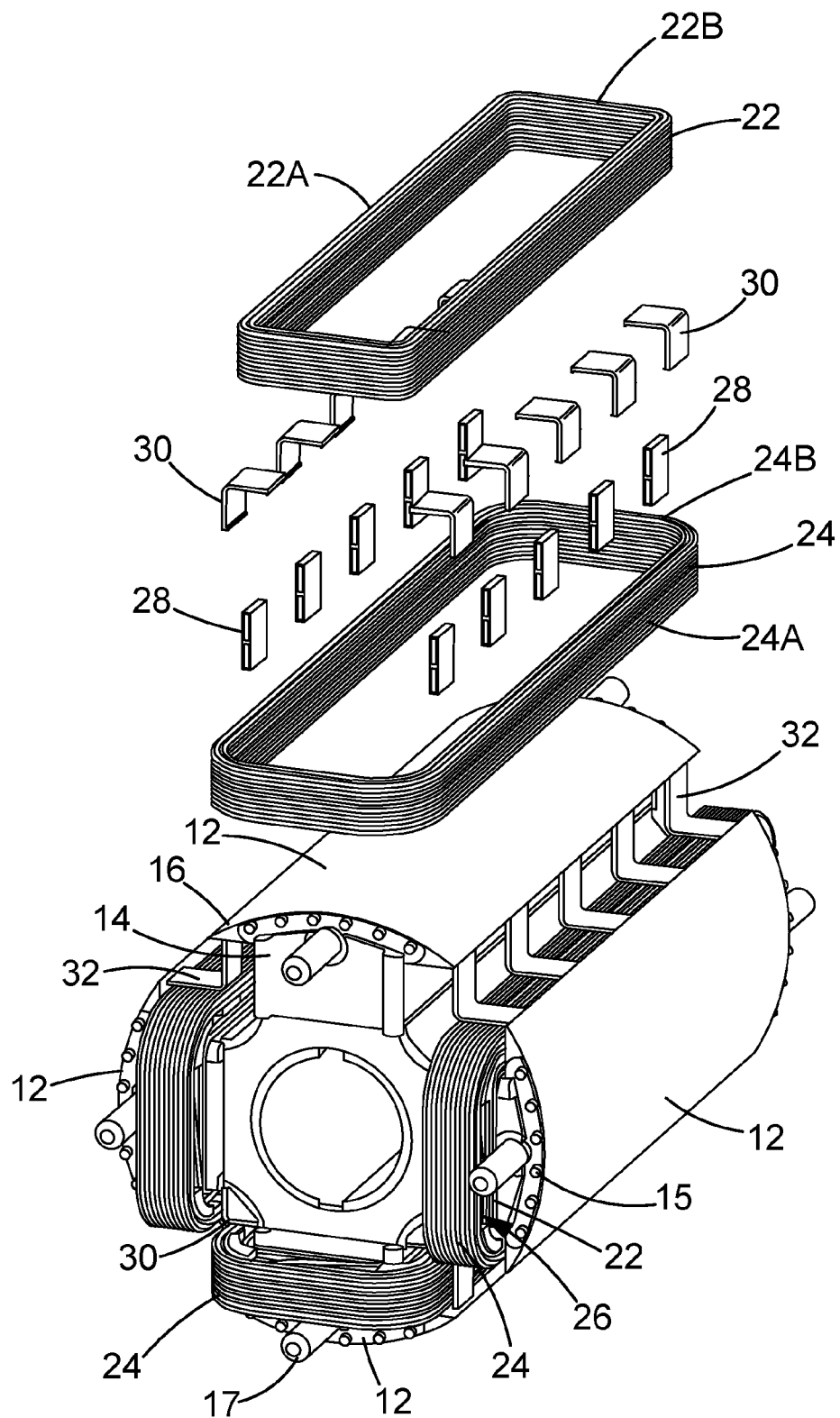
FIG. 4 is an exploded view of parts of the rotor in the embodiment of FIG. 3.

FIG. 4 shows an exploded view of parts of a rotor in this embodiment. Referring to FIG. 4, each rotor pole 12 is wound with an inner set of windings 22 and an outer set of windings 24. Each set of windings is in the form of a coil of an electrical conductor, such as copper wire. Although not shown in FIG. 4, the two sets of windings may each be part of one continuous coil. The inner set of windings 22 comprises side windings 22A which extend axially along the length of the rotor beneath the pole shoe 16, and end windings 22B which extend out of the rotor and wrap around the end of the rotor pole. Similarly, the outer set of windings 24 comprises side windings 24A and end windings 24B.

The inner set of windings 22 is arranged to sit inside the outer set of windings 24, with an air gap 26 between the two. The air gap 26 extends in a substantially axial direction through the rotor between the side windings 22A, 24A of the two sets of winding to form an axial cooling vent. In addition, as can be seen from FIG. 4, the air gap 26 extends around the end of the rotor, between the end windings 22B, 24B of the two set of windings. Thus, the air gap 26 is present essentially the whole way around the rotor. In this embodiment the width of the air gap 26 is substantially constant, although in other embodiments the width may vary.

In the arrangement of FIG. 4, the two sets of windings are held apart by a plurality of spacer blocks 28. The spacer blocks 28 are provided at axially spaced locations between the side windings 22A, 24A of the two sets of windings. As a consequence, the windings are exposed to the air gap 26 at locations between the spacer blocks 28.

A plurality of winding supports 30 is provided beneath the windings of two adjacent poles. Each winding support 30 is located beneath a spacer block 28 in each of two adjacent poles. A plurality of retaining wedges 32 is also provided. Each retaining wedge 32 is provided above a spacer block 28 in each of two adjacent poles. This arrangement helps to avoid deformation of the windings.

During manufacture, the inner set of windings 22 is first wound between the winding supports 30 and the pole shoes 16. The spacer blocks 28 and the appropriate tooling are then inserted. The outer set of windings 24 is then wound on the spacer blocks and tooling. The two sets of windings 22, 24 are one continuous coil of the electrical conductor, separated by the air gap 26. The wedges 32 are used to retain the windings while the rotor is spinning.

The air gap 26 may be provided by removing one or more layers of windings which would otherwise be present on the rotor pole. In one embodiment, the air gap 26 is formed by removing two layers of windings from the winding process. However, a different number of layers of windings, such as one, three or more, could be removed instead. Furthermore, the width of the air gap 26 need not be a multiple of the thickness of the electrical conductor, and it could be some fraction thereof.

In one particular arrangement, a suitable width of the air gap has been found to be approximately 9 mm, although of course other values may be used instead, and this value may vary depending for example on the size of the machine, the thickness of the electrical conductor and the number of layers of windings.

Figure 5:
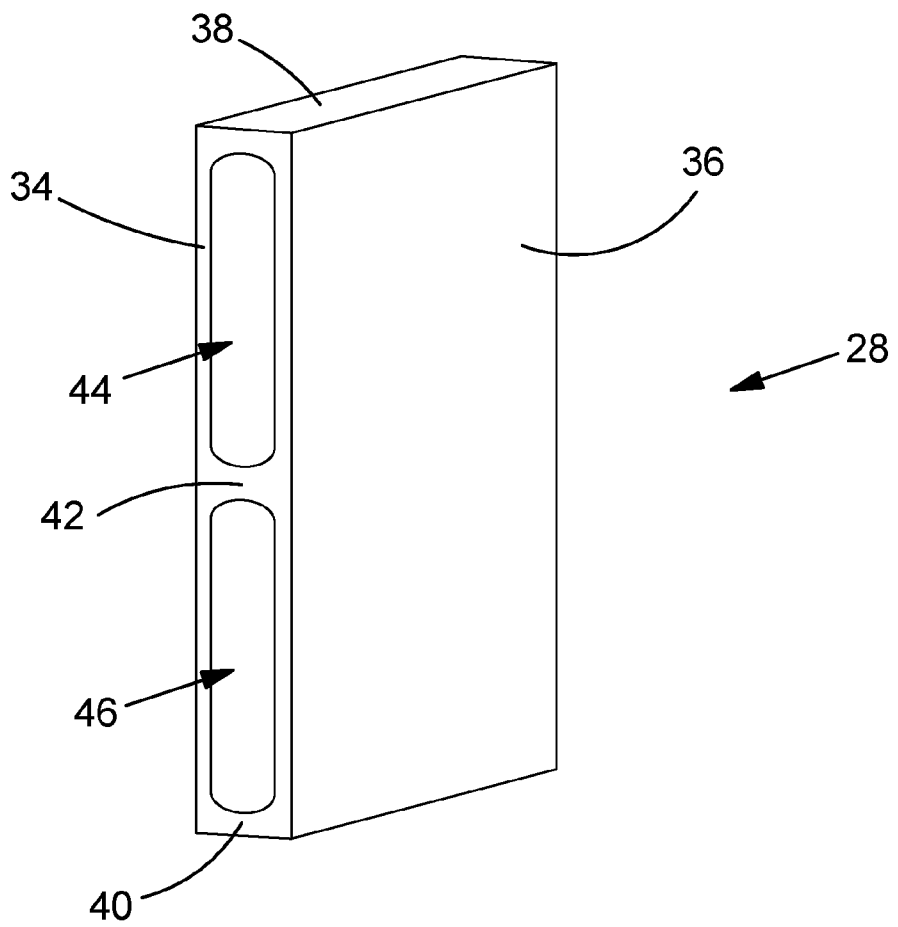
FIG. 5 shows a hollow spacer block in more detail.

FIG. 5 shows one of the hollow spacer blocks 28 in more detail. Referring to FIG. 5, the spacer block 28 comprises two parallel side walls 34, 36, end walls 38, 40 and an internal wall 42. The side walls 34, 36 are held apart by the end walls 38, 40 and internal wall 42 to create air passages 44, 46. The spacer block is designed to sit between an inner set of windings 22 and an outer set of windings 24, with each of the sidewalls lying against a respective set of windings. When the spacer block is in place, the air passages 44, 46 run in an axial direction through the side windings.

The primary function of the spacer blocks 28 is to provide a mechanical structure between the two separate sets of windings. The spacer blocks are designed to prevent movement or collapse under both rotating conditions, and compression during rotor wedge application. However, it is also desirable for the spacer blocks to allow as much air flow as possible. Therefore, the design of the spacer blocks is a trade-off between, on one hand, ensuring sufficient mechanical strength, and on the other hand minimising blockage of the air flow path. The thickness of the walls is therefore chosen to be as small as possible consistent with providing the required mechanical strength. In one embodiment, the walls have a thickness of approximately 1 mm, although of course other values may be used instead depending for example on the size of the machine. In addition, the walls may be rounded at the junctions between two walls, in order to provide additional strength where it is required.

The spacer blocks 28 can be manufactured from any suitable material. However, an electrically insulating material is preferred so that an extra layer of insulation is not required. In one embodiment the spacer blocks are manufactured from a heat resistant plastic, although other materials may be used instead.

Figure 6:
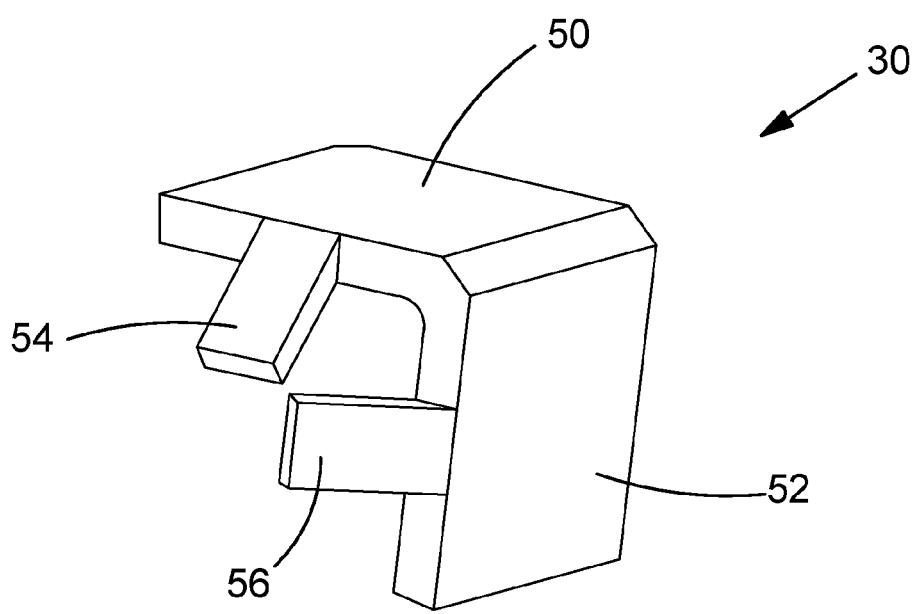
FIG. 6 shows a winding support in more detail.

FIG. 6 shows one of the winding supports 30 in more detail. Referring to FIG. 6, the winding support 30 is an L-shaped piece comprising a first arm 50 and a second arm 52, which are arranged at an angle of approximately 90° to each other. The primary function of the winding support is to hold up the windings during the winding process and when the machine is in use. However, in this embodiment, the winding support also provides a secondary function, which is to deflect some air flow from under the windings up into the axial air gap 26. This is achieved by providing deflectors 54, 56 on the winding support. Each deflector 54, 56 extends outwards from the side of one of the arms 50, 52, at an angle thereto. In a preferred embodiment, the angle of the deflectors is approximately 45° to the axial direction, although other values could be used instead. The deflectors 54, 56 are aligned with the air gap 26, and help to prevent air from escaping from the air gap 26 and returning to the bottom inter-polar gap 31 between two rotor poles.

In one preferred embodiment, the following method may be used when assembling the rotor.

1. Insert the winding supports 30.
2. Wind the first set of windings 22 between the pole shoes 16 and the winding supports 30. This is done is the same way as the bottom layers of a convention winding. However, in this case the winding process is stopped part way through, for example at the centre of the winding, or one or more layers above or below, to allow for an air gap.
3. Insert the spacer blocks 28. The spacer blocks are aligned with the rotor wedge positions (above the winding supports 30), so that the windings are not deformed during the wedging process. The spacer blocks are designed such that they have a slight interference fit between the pole shoes 16 and the winding supports 30, so they are retained through friction and do not fall out during winding.
4. Insert tooling. The tooling is designed to provide the mechanical support for the second stage of the winding process and to allow the rotor to be taped and dressed without collapsing.
5. Wind the second set of windings 24 on the spacer blocks and tooling.
6. Insert the wedges 32.
7. Tape the rotor. In this embodiment, the rotor is taped to avoid tape being tightly wound across the corners and potentially narrowing the air gap. Instead, the two sets of windings are individually taped, and only joined through the end winding support (see below), which is wrapped in tape.
8. Remove those parts of the tooling which are not required on the finished rotor.

The tooling for this design needs to achieve a number of different objectives. Firstly, the tooling should prevent collapse of the corners during the winding process, that is, the air gap should be maintained around the entire rotor. The tooling should also prevent axial movement of the coils during winding and wedging. In addition, the tooling should allow the rotor to be fully taped and dressed without collapsing, and provide the required mechanical support for this stage. Finally, the tools should not interfere with the coil crossover points, and should therefore allow space for a crossover per pole.

In order to meet these criteria, in one embodiment a new set of tooling has been developed to facilitate the winding process.

Figure 7:
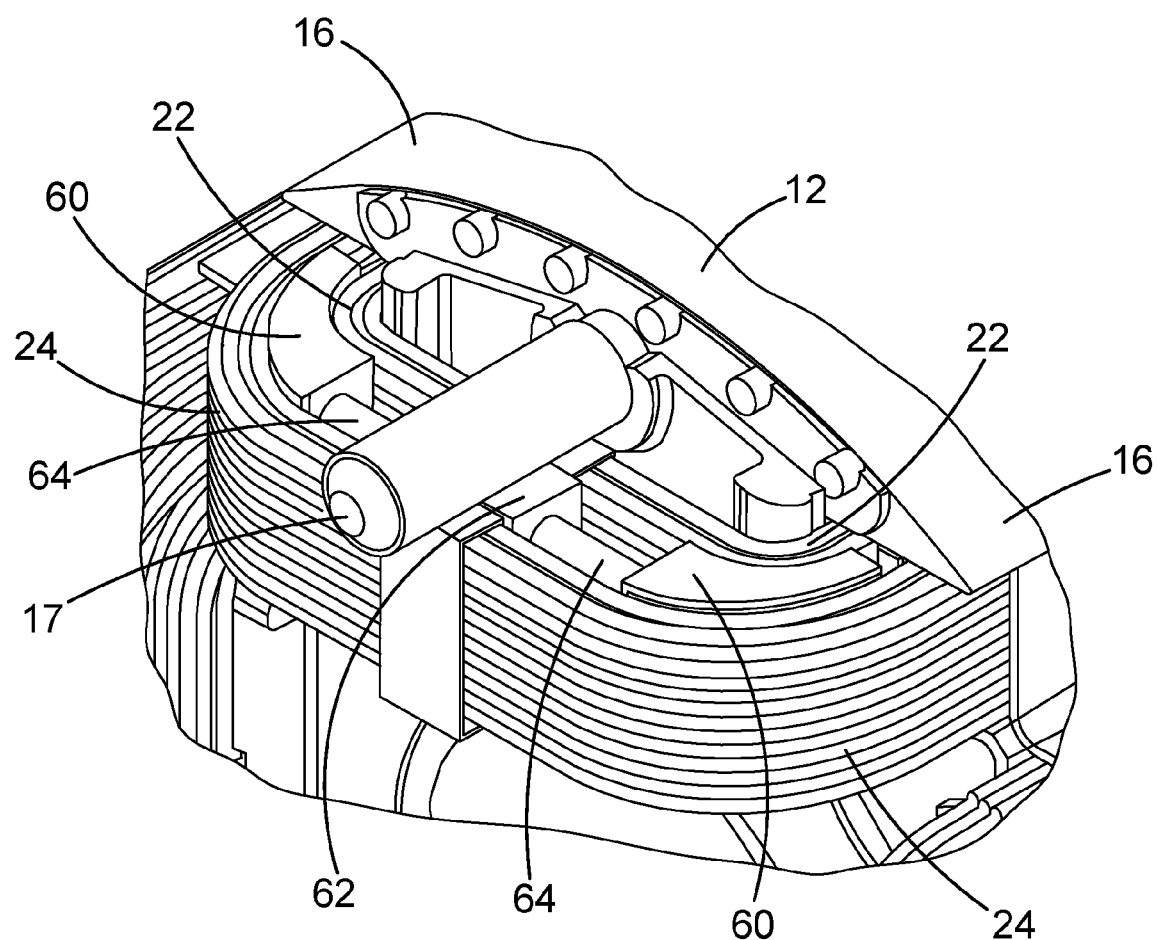
FIG. 7 shows part of a rotor in an embodiment of the invention.

FIG. 7 shows part of a rotor in an embodiment of the invention, with the tooling in place. Referring to FIG. 7, the tooling in this embodiment comprises corner supports 60, end winding supports 62, and corner support spacers 64.

The corner supports 60 are made from a solid block of material, with a thickness and height approximately equivalent to that of the air gap 26. The corner supports extend through the windings at the transition between the side windings and the end windings. The corner supports 60 are curved, with a radius of curvature which corresponds to that of the windings as they exit from under the pole shoes and bend around the end of the rotor. The corner supports 60 are used to prevent the corners from collapsing during the winding process and are removed from the finished rotor.

The end winding supports 62 are also made from a solid block of material, with a thickness and height approximately equivalent to that of the air gap 26. The end winding supports 62 are provided towards the middle of the end windings, one on either side of the rotor lamination support bar 17. The end winding supports 62 maintain the air gap on the end winding and allow the rotor to be taped tightly without collapsing the air gap. The end winding supports 62 remain in place in the rotor, and thus have a length which is as short as possible while ensuring sufficient mechanical strength.

The corner support spacers 64 are made from a solid block of material, and fit between the corner supports 60 and the end winding supports 62. The corner support spacers 64 prevent the corner supports 60 from slipping and collapsing towards the centre. The corner support spacers 64 are removed following winding.

The corner supports 60, end winding supports 62 and corner support spacers 64 may be made from any suitable material, such as a heat resistant plastic.

Although they are shown as solid blocks in FIG. 6, they could alternatively be hollow and/or have holes or slots. Alternatively or in addition, hollow spacer blocks such as those used between the side windings could be provided in the end windings.

In other embodiments, it may be possible to wind the rotor with a reduced number of tooling parts, or without the use of tooling.

Figure 8:
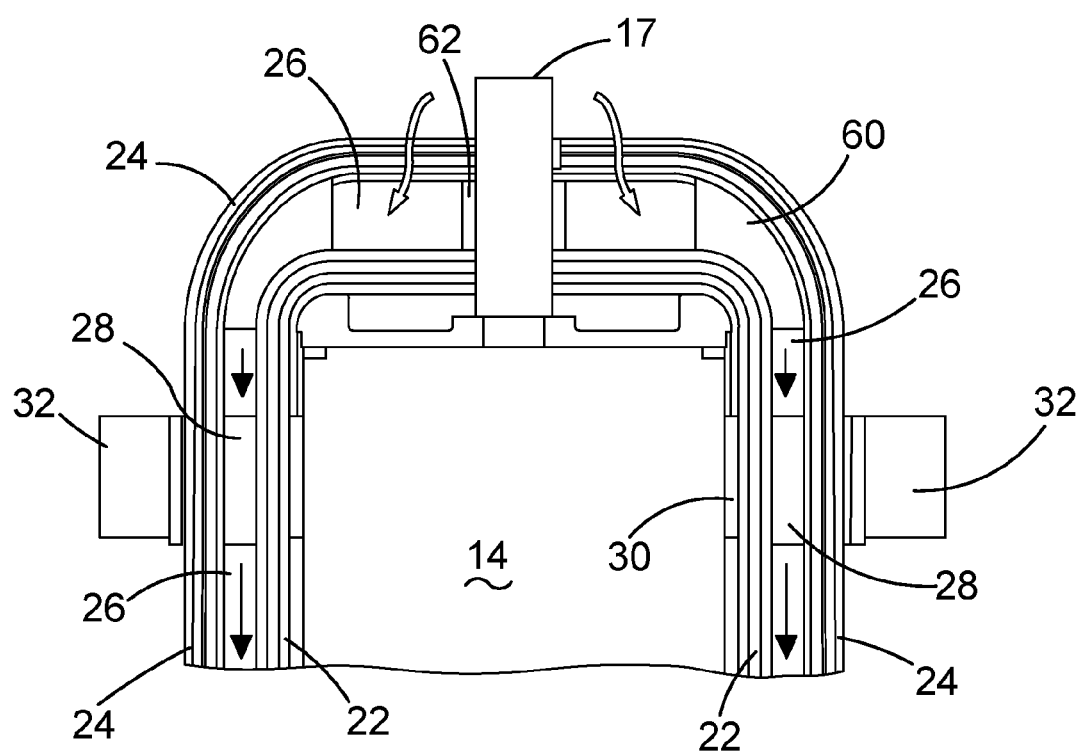
FIG. 8 is a cross-section through part of the rotor, viewed from above.

FIG. 8 is a cross-section through part of a rotor in an embodiment of the invention, viewed from above. Referring to FIG. 8, the rotor comprises a first, inner set of windings 22 and a second, outer set of windings 24, with an air gap 26 between the two. The air gap is created by spacer blocks 28. FIG. 8 also shows the corner supports 60, although these may be removed after winding. As can be seen from FIG. 8, the air gap 26 runs in a substantially tangential direction (left and right in FIG. 8) between the end windings, and continues around the sides of the rotor in a substantially axial direction (up and down in FIG. 8) between the side windings. Thus, the air gap runs substantially the whole way around the rotor, with the exception of the central portion of the end windings where the end winding supports 62 are located.

In operation, axial air flow through the machine is produce by a fan, which may be mounted on the rotor shaft or elsewhere. Air flow enters the air gap 26 in an essentially radial direction between the end windings of the two sets of windings 22, 24 as indicated by the arrows at the top of FIG. 8. Air flow is then diverted into an axial direction through the air gap 26 between the side windings, as indicated by the middle arrows in FIG. 8. Air flow then continues through the air gap in an axial direction, as indicated by the bottom arrows in FIG. 8. This process is assisted by the deflectors on the winding support 30, which deflect air flow from the bottom inter-polar gap 31 back up into the air gap 26. Air flow then exits the air gap 26 through the end windings at the other end of the rotor (not shown in FIG. 8).

Figure 9:
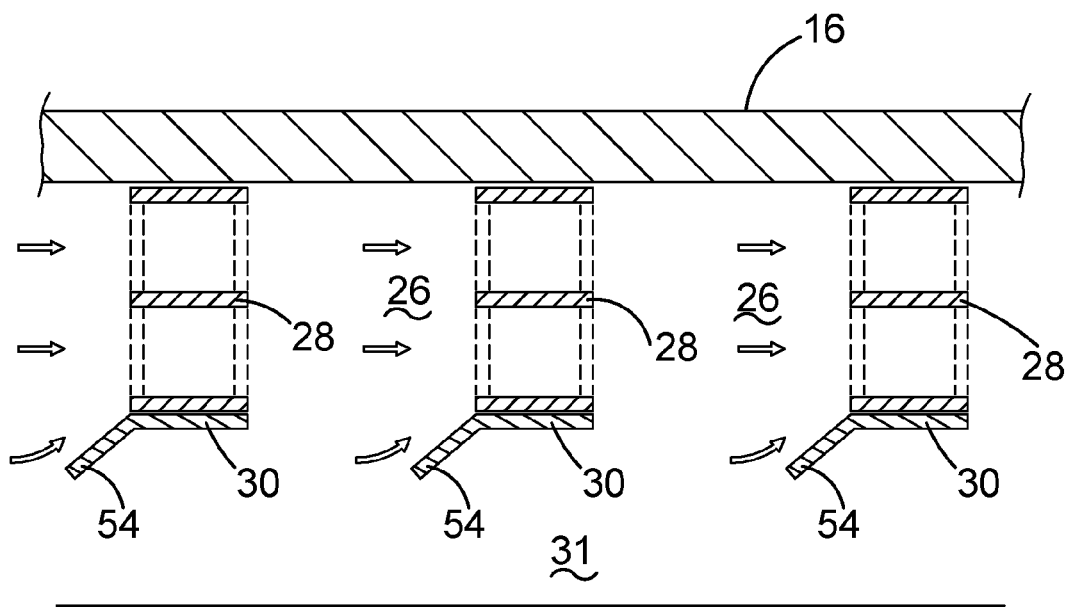
FIG. 9 is a cross-section through part of the rotor, viewed from the side.

FIG. 9 is a cross-section through part of the rotor, viewed from the side, dissecting the air gap 26. In operation, air is drawn in an axial direction through the machine, from left to right in FIG. 9. As indicated by the arrows in FIG. 9, air flows axially through the spacer blocks 28 and the spaces therebetween. In addition, the deflectors 54 on the winding supports 30 deflect air flow from the bottom inter-polar gap 31 up into the air gap 26. This helps to reduce the amount of air which escapes from the air gap 26 and returns to the bottom inter-polar gap 31.

The introduction of an air gap between two layers of windings in the way described above provides the advantage that the area of the windings which is exposed to cooling medium is significantly increased. Tests carried out by the applicant have found that this can enhance heat transfer through forced convection. The deflectors 54, 56 were found to be effective in helping to maintain good air flow throughout the air gap particularly at the drive end. Furthermore, it has been found that the proportion of air flow through the rotor (compared to the stator) can be increased. This may enhance the overall effectiveness of the cooling. In addition, it has been found that the enhanced cooling can compensate for the removal of one or more layers of windings, thereby allowing the rotor to be lighter and more cost effective to manufacture.

In the arrangement of FIGS. 3 through 9, since the axial vents also extend through the windings in a substantially radial direction, relatively little centrifugal force is applied to the spacer blocks 28. This can allow the spacer blocks to be discontinuous, thereby allowing direct exposure of the windings to the axial cooling channel. Furthermore, this design can help to prevent slippage or deformation of the windings into the air gaps. In addition, the spacer blocks may be lighter and/or manufactured from a more cost-effective material than might otherwise be the case. It has also been found that this arrangement can be relatively easy to manufacture, compared to some previous designs, and may allow the use of round conductors rather than square conductors.

In other embodiments, a plurality of axial vents is provided through the rotor windings. This could be achieved by the removal of some additional layers of windings. For example, one possible arrangement might be, in the direction of winding (i.e. from the rotor pole outwards):

2 layers of windings
Vent
2 layers of windings
Vent
2 layers of windings.

Of course it will be appreciated that this is just an illustration, and other arrangements are possible.

Figure 10:
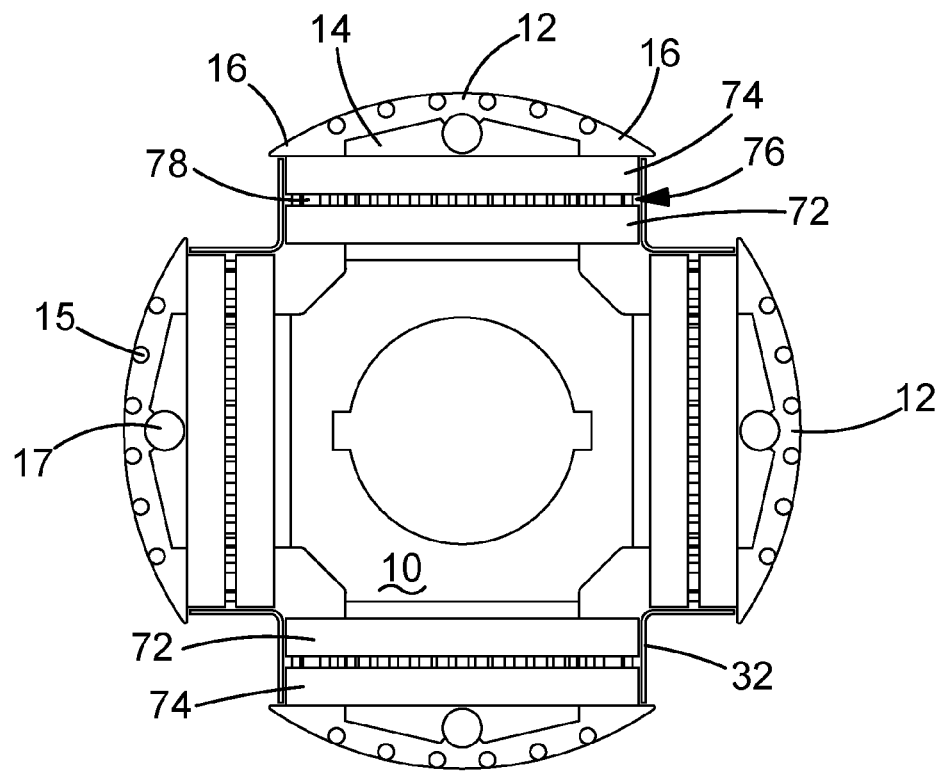
FIG. 10 is an end view of part of a rotor in another embodiment of the invention.

FIG. 10 shows an end view of part of a rotor in another embodiment of the invention. Referring to FIG. 10, the rotor comprises a rotor body 10 with a plurality of salient poles 12. Each of the salient poles comprises a main body 14 and pole shoes 16. Each pole is wound with two sets of windings 72, 74. Retaining wedges 32 are provided on the outside of the windings to hold the windings in place. Although not shown in FIG. 10, winding supports may be provided beneath the windings in a similar way to the previous embodiments.

In the arrangement of FIG. 10, each pole is wound with a first, radially inwards set of windings 72, and a second, radially outwards set of windings 74. Thus, in this embodiment, the two sets of windings 72, 74 are adjacent to each other in a radial direction. The two sets of windings 72, 74 are held apart using a hollow spacer 78. The hollow spacer 78 creates air gaps 76 between the two sets of windings.

As in the previous embodiments, the air gaps 76 of FIG. 10 form axial vents, that is, vents which extend through the rotor windings in an axial direction (perpendicular to the plane of the paper in FIG. 10). The axial vents are located between the side windings of the two sets of windings 72, 74, under the pole shoes 16. The axial vents extend through the whole of the rotor in an axial direction. However, in this embodiment, the axial vents also extend through the windings in a direction which is substantially perpendicular to pole, from the main body 14 to the retaining wedges 32.

Figure 11:
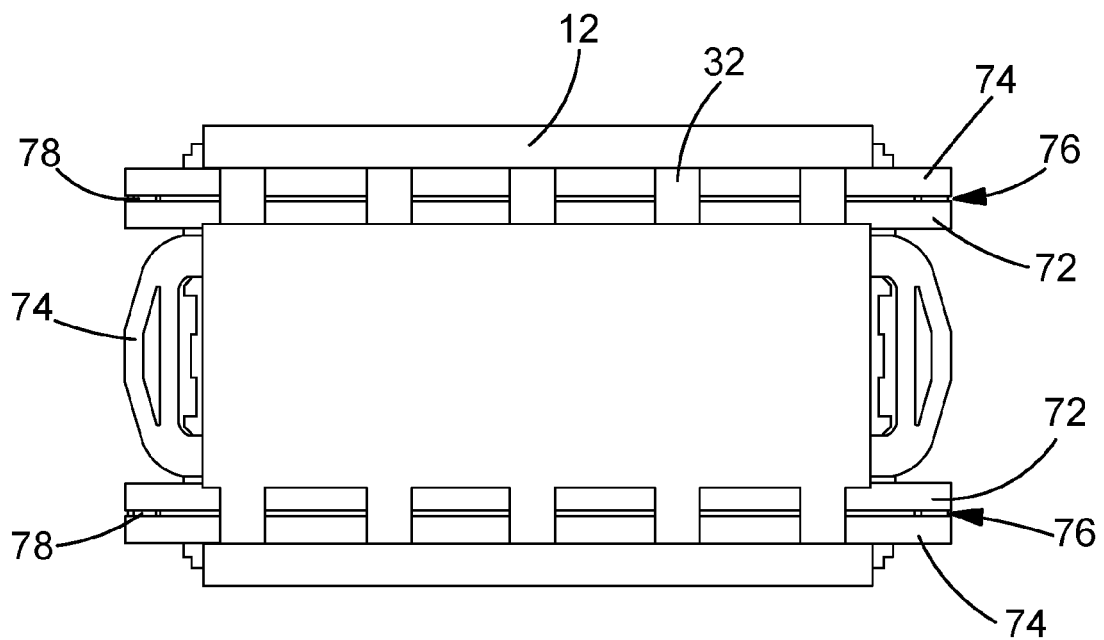
FIG. 11 is a side view of the rotor of FIG. 10.

FIG. 11 shows a side view of the rotor of FIG. 10. As can be seen from FIGS. 10 and 11, in this embodiment, the axial vents extend through the whole of the windings in an axial direction, through the whole of the windings in a tangential direction (away from the rotor pole) and through part of the windings in a radial direction (parallel to the rotor pole). The arrangement of FIGS. 10 and 11 can thus facilitate movement of air through the entire length of rotor, thereby enhancing the overall effectiveness of the cooling.

Figure 12:
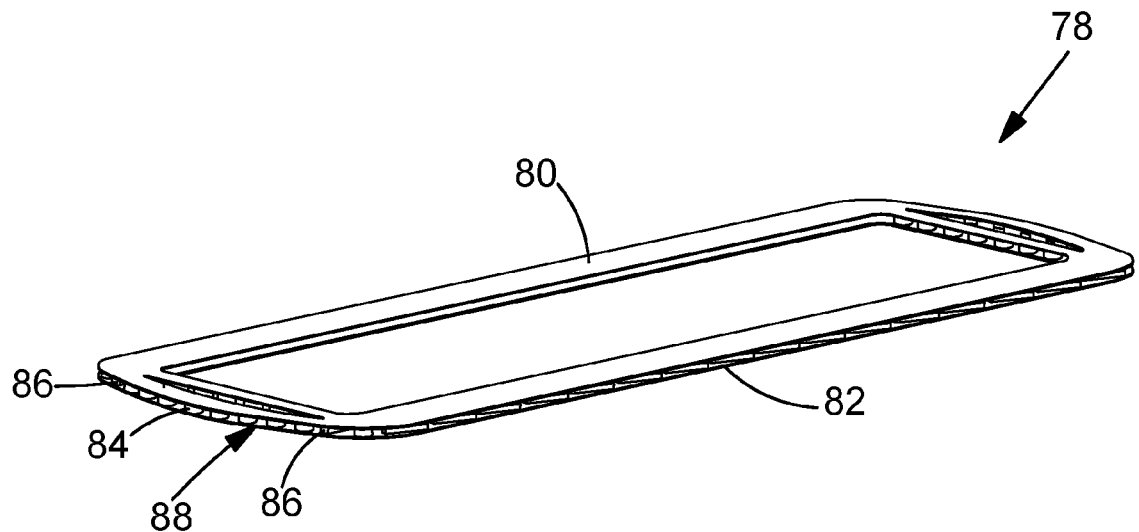
FIG. 12 shows one embodiment of a spacer for creating an air gap.

FIG. 12 shows one embodiment of a spacer 78 for creating the air gaps in the embodiment of FIGS. 10 and 11.

In this embodiment, the spacer 78 is formed as a single piece (or a plurality of interlocking pieces) rather than as a plurality of spaced apart pieces as in the previous embodiments. The spacer is designed to sit between two sets of windings, in the way illustrated in FIGS. 10 and 11.

Referring to FIG. 12, the spacer 78 is generally annular, and is designed such that, in use, it extends around a rotor pole between two sets of windings 72, 74. The spacer 78 comprises a top wall 80 and a bottom wall 82 separated by a plurality of studs 84 and two support beams 86. The top wall 80 and bottom wall 82 are designed to interface with the windings. The studs 84 and support beams 86 connect the top wall and the bottom wall while holding them apart. Gaps 88 between the studs and support beams create air vents through the spacer. Holes 85 through the spacer are provided at the ends which sit between the end windings, in order to allow air flow in a radial direction to the end windings.

Figure 13:
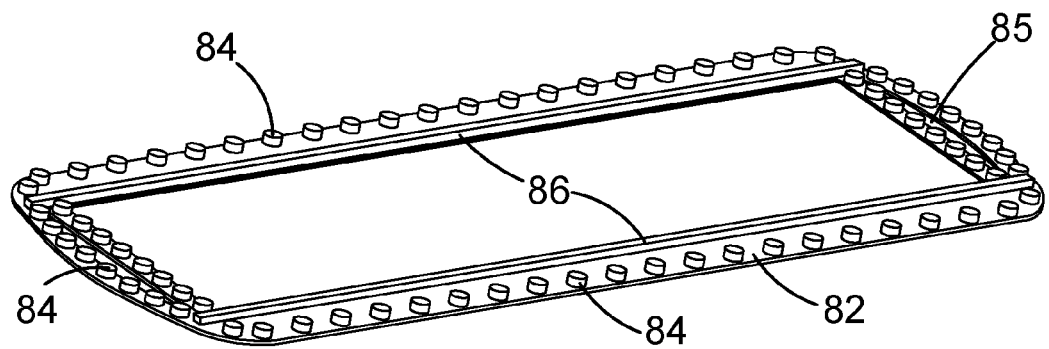
FIG. 13 shows parts of the spacer with the top wall removed.

FIG. 13 shows parts of the spacer 78 with the top wall removed. Referring to FIG. 13, the studs 84 are used to separate the top wall and the bottom wall and to direct air through the separator. In this embodiment the studs are made of mild steel with a height of approximately 5 mm and a diameter of approximately 10 mm. The support beams 86 run the length of the spacer in an axial direction. In this embodiment they have a height and width of approximately 5 mm. They are used to direct air axially through the machine. In this embodiment, the top wall 80 and bottom wall 82 are made from a mild steel lamination with a thickness of approximately 1 mm. Of course, it will be appreciated that in all cases different dimensions and different materials may be used as appropriate.

During manufacture, the bottom set of windings 72 is first wound onto the winding supports (where present). The spacer 78 is then assembled onto the rotor, on top of the bottom set of windings 72. The top set of windings 74 is then wound on top of the spacer 78, between the spacer and the pole shoe 16. The two sets of windings 72, 74 are one continuous coil, separated by the space 78. The wedges 32 are then inserted to retain the windings while the rotor is spinning.

Figure 14:
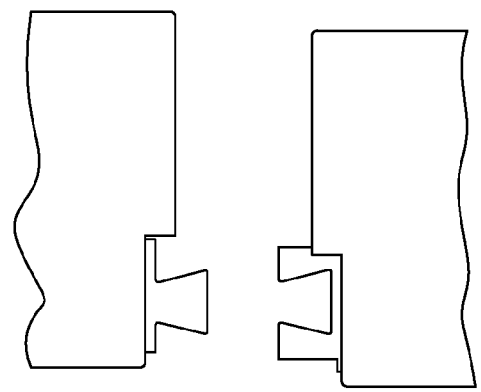
FIG. 14 shows how a spacer may be provided with interlocking joints.

In order to facilitate assembly of the spacer onto the rotor, the spacer 78 may be provided with interlocking joints as shown in FIG. 14. Thus, the spacer may be provided as two separate U-shaped pieces which are joined together when the spacer is assembled onto the rotor.

Figure 15:
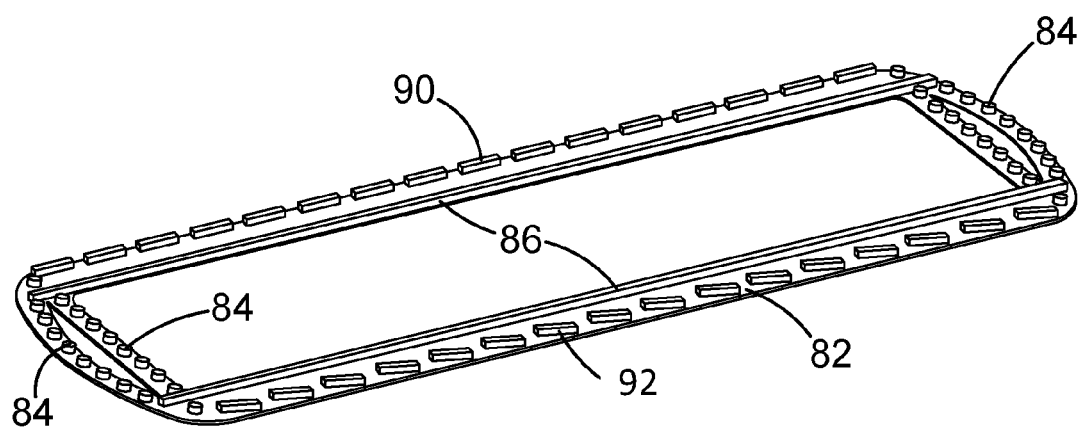
FIG. 15 shows parts of a spacer in another embodiment of the invention.

FIG. 15 shows parts of a spacer with the top wall removed in another embodiment of the invention. The spacer of FIG. 15 comprises a top wall (not shown) and a bottom wall 82, in a similar way to the spacer of FIGS. 12 and 13. The top wall and bottom wall are separated by a plurality of studs 84 and two support beams 86. The studs 84 are provided at the ends of the spacer, where it sits between the end windings. In addition, a plurality of beams 90, 92 is provided through the main part of the spacer where it sits between the side windings. The plurality of beams comprises a first set of beams 90 on that part of the spacer which is to sit on the trailing edge of the rotor pole, and a second set of beams 92 on that part of the spacer which is to sit on the leading edge of the rotor pole.

As in the arrangement of FIGS. 12 and 13, the support beams 86 run the entire length of the rotor core, and function to direct flow in an axial direction through the windings. The first set of beams 90 run parallel to the support beams (that is, in a axial direction) and also function to direct flow in an axial direction. However, the second set of beams 92 are angled with respect to the axial direction. The angle is such as to direct air flow inwardly as the rotor rotates, to enhance the axial flow of air through the windings. Thus, the second set of beams 92 may provide a function which is similar to that of the deflectors 54, 56 shown in FIG. 6. Alternatively, or in addition, winding supports such as that shown in FIG. 6 could be used in conjunction with any of the spacer arrangements shown in FIGS. 12 through 15.

It has been found that, by using a continuous spacer of the type shown in FIGS. 10 through 15, the rotor may be relatively easy to manufacture, and slippage or deformation of the windings into the air gaps may be reduced or avoided. Thus, this type of spacer may be appropriate for certain types of machines.

If desired, a plurality of axial vents could provided through the rotor windings, with some or all of the axial vents being formed by spacers of the type shown in FIGS. 10 through 15.

In any of the above embodiments, the windings may be formed from round conductors, square conductors, or conductors having any other appropriate cross section.

FIGS. 16(A) and 16(B) illustrate an embodiment of the invention using round conductors. An axial cross section through the rotor is shown in FIG. 16(A). The rotor comprises rotor body 10 with a plurality of salient poles 12. Each pole is wound with a first, inner set of windings 22 and a second, outer set of windings 24. An axial and radial air gap 26 is provided between the two set of windings, in the manner described in the above embodiments.

FIG. 16(B) shows part of the rotor body in more detail. In this embodiment, the windings 22, 24 are wound from a round wire conductor 94 (i.e. a wire having a round cross section). The windings are wound in an essentially orthocyclic winding structure, with the windings in one layer placed in the grooves provided by the layer below. Spacer blocks 28 are provided between the first set of windings 22 and the second set of windings 24 in order to create the air gap 26 through the windings. L-shaped winding supports 30 are provided beneath the windings of two adjacent poles, to support the underside of the windings. As can be seen from FIG. 16(B), the winding supports 30 include lips at each end, which fit into corresponding slots 96 in the rotor core, in order to hold the supports in place. In this embodiment, a wedging arrangement 98 is also provided on the outside of the windings. The wedging arrangement presses against the outer windings of two adjacent poles in order to hold the windings in place.

FIGS. 17(A) and 17(B) illustrate an embodiment of the invention using square conductors. The rotor design of FIGS. 17(A) and 17(B) is similar to that of FIGS. 16(A) and 16(B) described above. However, in the arrangement of FIG. 17, the windings 22, 24 are wound from a square conductor 95 (i.e. a conductor having a square cross section). Use of a square conductor can allow a higher winding fill factor to be achieved. Furthermore, use of a square (or rectangular) conductor allows a flat surface to be presented to the spacer blocks 28, as well as the other parts which are in contact with the windings. This may help to provide a more stable mechanical structure between the two sets of windings.

It will be appreciated that embodiments of the invention have been described above by way of example only, and variations are possible. For example, a continuous spacer could be used with the air gaps shown in FIGS. 3 and 4. Likewise, discontinuous spacers could be used with the air gaps shown in FIGS. 10 and 11. Other modifications will be apparent to the skilled person with in the scope of the claims.

The invention claimed is:

1. A rotating electrical machine comprising a rotor, a stator, and a fan for drawing cooling air axially through the rotating electrical machine, the rotor comprising:
   a plurality of salient poles;
   rotor windings wound on the plurality of salient poles, the rotor windings comprising a first set of windings and a second set of windings on a same pole of the plurality of salient poles;
   at least one spacer in the rotor windings, the at least one spacer positioned between the first set of windings and the second set of windings and forming an axial cooling vent for the cooling air to pass axially through the rotor windings, the at least one spacer comprising at least one axial air passage; and
   a winding support for supporting the rotor windings, the at least one spacer held on the rotor by an interference fit between a pole shoe of one of the salient poles and a first side of the winding support,
   wherein a second side of the winding support comprises a deflector configured to deflect air flow into the axial cooling vent,
   wherein the axial cooling vent formed by the at least one spacer extends through the rotor windings in an axial direction and a substantially radial direction,
   wherein the axial cooling vent formed by the at least one spacer extends in the axial direction from one end axially of one of the salient poles to another end axially of the salient pole, and
   wherein the axial cooling vent formed by the at least one spacer extends in the substantially radial direction from one end radially of the first set of windings to another end radially of the first set of windings.

2. The rotating electrical machine according to claim 1, wherein an entry path to the axial cooling vent is provided at one end axially of the rotor and an exit path from the cooling vent is provided at another end axially of the rotor.

3. The rotating electrical machine according to claim 1, wherein the axial cooling vent extends radially through an entirety of the windings.

4. The rotating electrical machine according to claim 1, wherein the first set of windings is beneath the second set of windings, in a direction away from the pole of the plurality of salient poles.

5. The rotating electrical machine according to claim 1, wherein the at least one spacer comprises two parallel walls held apart by spacing elements to create air passages.

6. The rotating electrical machine according to claim 1, wherein the at least one spacer comprises a plurality of spacers at spaced locations in the axial direction between the first set of windings and the second set of windings.

7. The rotating electrical machine according to claim 6, wherein the rotor windings are exposed to the cooling air at locations between the plurality of spacers.

8. The rotating electrical machine according to claim 6, wherein each spacer of the plurality of spacers is arranged such that, when the rotor is wound with the first set of windings, each spacer is configured to be held on the rotor with the interference fit.

9. The rotating electrical machine according to claim 1, wherein the at least one spacer extends continuously around at least one of the plurality of salient poles.

10. The rotating electrical machine according to claim 1, wherein the winding support is collocated with the at least one spacer in the axial direction.

11. The rotating electrical machine according to claim 1, further comprising an axial air channel between two adjacent poles of the plurality of salient poles, wherein the deflector extends into the axial air channel.

12. The rotating electrical machine according to claim 1, wherein the winding support comprises a first arm and a second arm, and each arm comprises the deflector arranged at an angle to the respective arm.

13. The rotating electrical machine according to claim 1, wherein the rotor windings comprise side windings and end windings, and a cooling vent is formed in both the side windings and the end windings.

14. The rotating electrical machine according to claim 13, further comprising an end winding support between the end windings of two sets of windings.

15. A rotating electrical machine comprising a rotor, a stator, and a fan for drawing cooling air axially through the rotating electrical machine, the rotor comprising:
   a plurality of salient poles;
   rotor windings wound on the salient poles;
   a plurality of spacers at spaced locations in an axial direction through the rotor windings, the plurality of spacers defining an axial cooling vent for the cooling air to pass axially through the rotor windings, each spacer comprising at least one axial air passage; and
   a winding support for supporting the rotor windings, at least one of the plurality of spacers held on the rotor by an interference fit between a pole shoe of one of the salient poles and a first side of the winding support,
   wherein a second side of the winding support comprises a deflector configured to deflect air flow into the axial cooling vent,
   wherein the rotor windings comprise a first set of windings and a second set of windings on a same pole of the plurality of salient poles, and the plurality of spacers are positioned between the first set of windings and the second set of windings to form the axial cooling vent between the first set of windings and the second set of windings,
   wherein the axial cooling vent formed by the plurality of spacers extends through the rotor windings in an axial direction and a substantially radial direction,
   wherein the axial cooling vent formed by the plurality of spacers extends in the axial direction from one end axially of one of the salient poles to another end axially of the salient pole, and
   wherein the axial cooling vent formed by the plurality of spacers extends in the substantially radial direction from one end radially of the first set of windings to another end radially of the first set of windings.

16. A method of winding a rotor for a rotating electrical machine, the rotor comprising a plurality of salient poles and a winding support, the method comprising:
   winding a pole of the plurality of salient poles with a first, inner set of windings;
   inserting at least one spacer on the first, inner set of windings, the at least one spacer comprising at least one axial air passage; and
   winding a second, outer set of windings of the pole on the at least one spacer;
   wherein the at least one spacer forms an axial cooling vent for cooling air produced by a fan to pass axially through the rotor windings between the first, inner set of windings and the second, outer set of windings, the axial cooling vent formed by the at least one spacer extending through the windings in an axial direction and a substantially radial direction, wherein the spacer is held on the rotor by an interference fit between a pole shoe of one of the salient poles and a first side of the winding support and a second side of the winding support comprises a deflector configured to deflect air flow into the axial cooling vent.

* * * * *